United States Patent [19]

Bluege

[11] 4,411,492
[45] Oct. 25, 1983

[54] DISPERSIONLESS REFRACTOR FOR USE WITH HIGH-POWER LASERS

[75] Inventor: John H. Bluege, Lake Park, Fla.

[73] Assignee: United Technologies Corporation, Hartford, Conn.

[21] Appl. No.: 233,417

[22] Filed: Feb. 11, 1981

[51] Int. Cl.³ ............................................. G02B 27/14
[52] U.S. Cl. .................................. 350/173; 350/162.23
[58] Field of Search .................... 350/162.23, 169, 173, 350/286, 397, 401, 402, 421

[56] References Cited

U.S. PATENT DOCUMENTS

| | | | |
|---|---|---|---|
| 1,081,031 | 12/1913 | Eppenstein | 350/286 |
| 1,898,787 | 2/1933 | Newcomer | 350/421 |
| 2,855,819 | 9/1958 | Luboshez | 350/421 |
| 4,114,978 | 5/1978 | Bostick et al. | 350/162.23 |
| 4,284,323 | 8/1981 | Jankowitz | 350/164 |

*Primary Examiner*—Bruce Y. Arnold
*Assistant Examiner*—William Propp
*Attorney, Agent, or Firm*—Eric W. Petraske

[57] ABSTRACT

A beam splitter or combiner suitable for use with high-power laser beams employs matched dispersive elements to correct for dispersion of a separated beam.

5 Claims, 4 Drawing Figures

DISPERSIONLESS REFRACTOR FOR USE WITH HIGH-POWER LASERS

DESCRIPTION

Technical Fields

The invention is used in separating beams of different wavelengths, particularly in the operation of high-power laser systems.

Background Art

A common approach used in the prior art to separate a high-power laser beam from a companion alignment or target return beam has been to separate the two beams with a diffraction grating. The grating introduces angular dispersion into the alignment beam, which covers a finite range of wavelengths, which dispersion is corrected by a collimating grating that is positioned to clear the high-power beam and is fabricated to cancel the angular dispersion and to produce a parallel output beam. The finite integrating spacing, however, necessarily gives rise to a lateral chromatic translation spread in that parallel beam that is a serious obstacle to the highly accurate alignment and data gathering procedures required for high-power laser systems. There is a lower limit to the integrating spacing, set by the requirement that the high-power beam not be obstructed and, therefore, the optical quality of the output alignment beam is also limited.

Correction of chromatic effects is well developed in cameras and other devices that function in the visible wavelength range. Some examples are: U.S. Pat. No. 2,815,695 that discloses the use of a neutral beam splitter that produces a pair of parallel beams of equal intensity (FIG. 2); U.S. Pat. No. 3,449,039 that separates beams on the basis of polarization; and U.S. Pat. No. 3,922,069 that discloses the separation of light of two colors from an input beam. None of the foregoing references discloses the correction of chromatic angular dispersion within the frequency range of one of the separated beams and all of them show embodiments that involve the transmission of the combined input beam through substantial amounts of glass, a feature that is not suitable for high-power beams, which would destroy a transmission beam splitter of the type used in the visible range. "From prism-prism via grating-prism to grating-grating compounds" by H. Dammann, Applied Optics Vol. 19, No. 14, July 1980, discloses transmission devices in which the net dispersion results from the difference of the dispersions of the single components.

Disclosure of Invention

The invention relates to a beam splitter for separating or combining a high-power laser beam and a companion beam of different frequency or polarization that alleviates the problem of distortion of the companion beam as a result of angular dispersion in the apparatus by the use of a plurality of optical elements having compensating dispersive properties, arranged in a configuration such that the high-power beam is only reflected, while the companion beam passes through the optical elements.

BEST MODE FOR CARRYING OUT THE INVENTION

Figure 1:
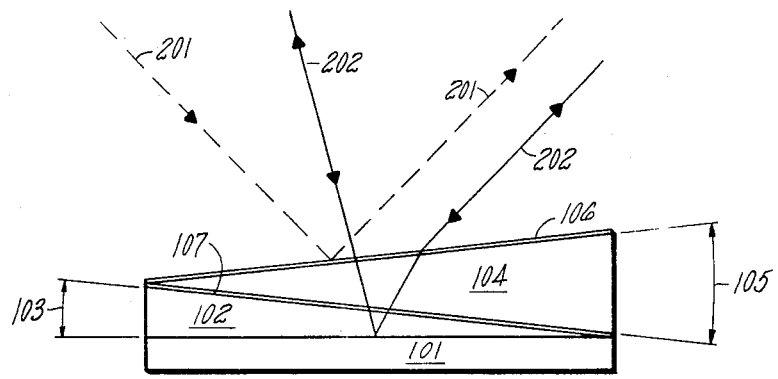
FIG. 1 shows, in partially pictorial, partially schematic form, an embodiment of the invention that employs two wedges.

In FIG. 1, an embodiment of the invention is illustrated, in which substrate 101 supports wedge prism 102 having an angle 103 and wedge prism 104 having an angle 105, connected by antireflective coating 107. On the top surface of wedge 104, dichroic coating 106 serves to reflect high-power laser beam 201 and to pass low-power beam 202, which may be an alignment beam or a target return beam. The arrows on the beams are placed only in order to facilitate the explanation, since the device will function either to separate or to combine beams. Dichroic coating 106, well known to those skilled in the art, may be designed to reflect and pass light of certain frequencies and/or polarizations.

For convenience in explanation, also, a particular case is illustrated in which beam 202 is normally incident on dichroic surface 106 and, therefore, is not refracted until it reaches the far edge of prism 104, passes through antireflection coating 107 and enters prism 102 at a small angle to the normal of the prism surface. Beam 202 is reflected from substrate 101, which has a mirror surface, passes through the interface between prisms 102 and 104 so close to the normal that refraction may be neglected and is again refracted as it emerges from prism 104. In this special case, the algebra is simple and is made more so by use of the small angle approximation.

The conditions for dispersion cancellation are then defined by $$\gamma = 2n_1 \alpha - 2n_2 \beta$$

$$\beta = \alpha \cdot \frac{dn_1/d\lambda}{dn_2/d\lambda}$$

where $\gamma$ is the separation angle between the incident and deflected beams, $\alpha$ is angle 105, $\beta$ is angle 103 and $n_1$ and $n_2$ are the indices of prisms 104 and 102, respectively. Extension to more general cases is straightforward.

In a more general case, where other system constraints prevent the use of a normal incidence, the alignment beam is traced through the two prisms and the total chromatic angular dispersion is summed up and then set equal to 0. In a particular system, it may be desirable to have more than two wedge prisms; or to include flat sheets of material in order to affect the dispersion without changing the beam angle. Any realistic system, of course, will involve a trade-off between the required separation angle, the materials available and the desirability of keeping the wedges thin, in order to reduce cooling problems. Those skilled in the art may easily apply the principles of the invention to choose a compromise suited for a particular system.

As an example, a target return beam having a wavelength spread centered near 10 $\mu$m may be separated from a hydrogen fluoride high-power laser beam having a wavelength spread in the vicinity of 3 $\mu$m by the embodiment of FIG. 1, in which prism 104 is formed from ZnSe, having an index $n_1 = 2.23$ and material dispersion $dn_1/d\lambda = 0.014$ and prism 102 is formed from $CaF_2$ having an index $n_2 = 1.3$ and material dispersion $dn_2/d\lambda = 0.025$; $\alpha$ is 1.8° and $\beta$ is 1°, then $\gamma = 5.4$° and two beams ten centimeters in diameter would be separated in one meter.

Figure 2:
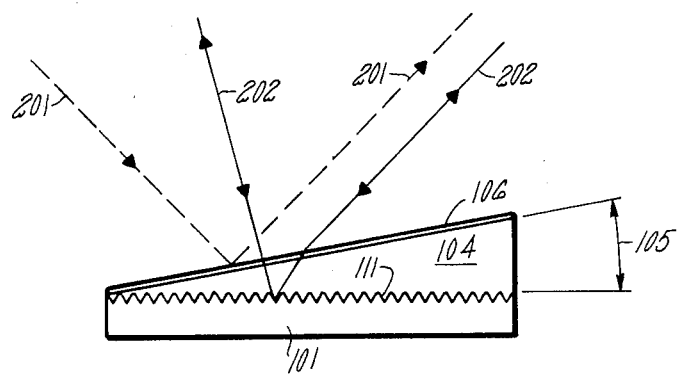
FIG. 2 shows, in partially pictorial, partially schematic form, an embodiment of the invention that employs a wedge and a grating.

In FIG. 2, an alternate embodiment employs a grating 111 in the surface of substrate 101 as a substitute for prism 102. Target return beam 202 enters at a normal to dichroic surface 106 and prism 104, is diffracted by grating 111 and refracted as it emerges from prism 104 in a direction parallel to beam 201, the reflected high-power laser beam. In this case, the condition for dispersion cancellation is:

$$\frac{\text{Tan}(\phi - \alpha)}{n} \cdot (dn/d\lambda) = \frac{nS}{\lambda}$$

where n is the index of refraction of the wedge, $\lambda$ is the vacuum wavelength of beam 202, $\alpha$ is angle 105, $\theta$ is the angle between beam 202 and the normal to coating 106, $\phi$ is the diffraction angle of beam 202 and S is the quantity $(\sin\theta + \sin\phi)/\cos\phi$.

The above equation uses the diffraction grating sign convention in which the diffracted angle $\phi$ is positive (or negative) if it is measured to a diffracted beam that is on the incident (or specular) side of the normal to the surface.

The equation used is:

$$\sin\theta + \sin\phi_m = m\lambda/d$$

where m is the number of the diffracted order and d is the grating line spacing.

It should be noted in the foregoing embodiment that dispersion cancelling can occur even if the wedge angle 105 goes to zero and that for large diffraction angles, the wedge angle may be neglected. As used herein, the term wedge prism includes the special case of a flat sheet which is a wedge with zero angle and finite thickness. This feature is advantageous in cases where a wedge may cause significant thermal distortion and fabrication problems.

The high-power beam is reflected by dichroic coating 106, as in conventional mirrors, but the cooling effect of substrate 101 will be hindered by the presence of the prisms. It is an advantageous feature of the invention that the prisms are quite thin and thus that the heat load on the dichroic coating will be nearly the same as for a conventional mirror.

Figure 3A:
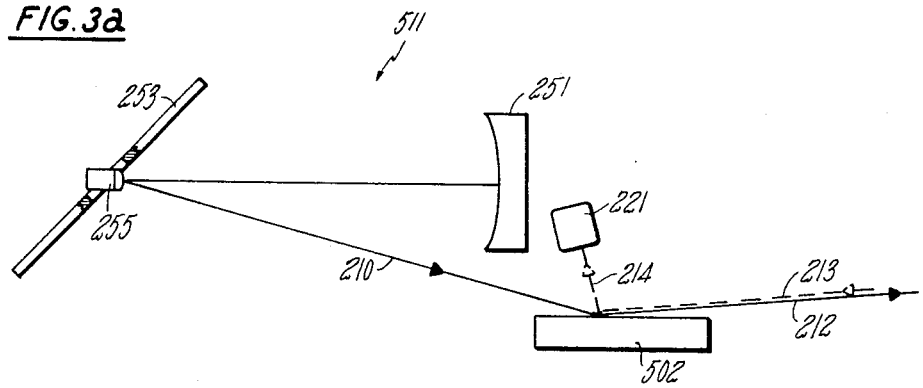
FIGS. 3a and 3b show, in partially pictorial, partially schematic form, two typical systems employing the invention.

FIG. 3a illustrates the use of a dispersionless refractor in a system in which a laser beam is directed onto a target, which must be tracked. High-power laser 511, including mirrors 251, 253 and 255 generates output beam 210 that is deflected from dispersionless refractor 502, mounted on movable supports so that the angular direction of beam 212, the reflected high-power output beam, may be varied. A return beam 213, reflected back from the target, returns along the same path as beam 212 and is deflected by refractor 502 along path 214 to monitoring equipment 221, which incorporates conventional equipment to control refractor 502 so that beam 212 remains centered on the target. Such detecting and control devices are well known to those skilled in the art and form no part of the present invention.

Figure 3B:
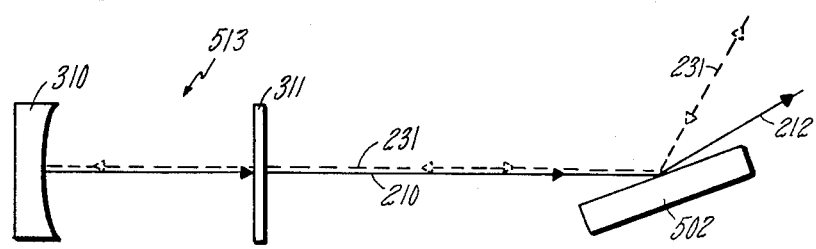

FIG. 3b shows the use of a dispersionless refractor for laser alignment, in which alignment beam 231 is generated by a visible laser not shown and is directed onto dispersionless refractor 502 at an angle such that it tracks along the same path as output beam 212, but in the opposite sense, back along beam path 231, superimposed on path 210, into laser 513 through partially transmitting mirror 311. Alignment beam 231 is there reflected from concave mirror 310 back through partially transmitting mirror 311 back along the same output beam path 231 superimposed on beam path 210. The two beams are separated in dispersionless refractor 502 and the alignment beam is directed back parallel with beam 231 to monitoring apparatus not shown.

The invention may be used in an embodiment in which the two beams may be in different polarization states and the dichroic coating responds differently to the two states. In a tracking device, a linearly polarized high-power beam may be generated, the target return beam being unpolarized. Dichroic coating 106 reflects the linearly polarized high-power beam and transmits that component of the unpolarized beam that is orthogonal to the polarization of the high-power beam.

What is claimed is:

1. Apparatus for manipulating optical beams comprising:
    a reflective substrate;
    a dichroic coating optically reflective to a first optical beam and transmissive to a second optical beam;
    at least two wedge prisms, formed from at least two materials optically transmissive to said second optical beam, each having an index of refraction, material dispersion, wedge angle and entrance and exit surfaces;
    in which one of said at least two prisms is mounted on said reflective substrate, the others of said at least two prisms are mounted adjacent said one of said prisms with the exit surface of one prism adjacent the entrance surface of the next prism and said dichroic coating is mounted adjacent that entrance surface furthest from said substrate, whereby radiation in said second optical beam passes through said dichroic coating and said first and second prisms, is reflected from said substrate back through said prisms and coating in such a manner that the material dispersions of said first and second prisms cancel so that said radiation in said second optical beam exits from said dichroic coating having substantially zero chromatic dispersion.

2. An apparatus according to claim 1, in which first and second wedge prisms are mounted intermediate said dichroic coating and said substrate, the exit surface of said second prism being adjacent said substrate, the entrance surface of said second prism being adjacent the exit surface of said first prism and the entrance surface of said first prism being adjacent said dichroic coating.

3. Apparatus for manipulating optical beams comprising:
    a reflective substrate;
    a dichroic coating optically reflective to a first optical beam and transmissive to a second optical beam;
    a wedge prism formed from a material optically transmissive to said second optical beam, having an index of refraction, material dispersion, wedge angle and entrance and exit surfaces and
    a diffraction grating for diffracting said second optical beam at a predetermined diffraction angle; in which said diffraction grating is mounted on said reflective substrate, said wedge prism is mounted with said exit surface adjacent said diffraction grating and said dichroic coating is mounted adjacent said entrance surface, whereby radiation in said second optical beam passes through said dichroic coating and said wedge prism, is diffracted from said diffraction grating, with a predetermined amount of chromatic dispersion, back through said wedge prism and said dichroic coating, said diffraction grating and wedge prism being determined in such a manner that said predetermined chromatic dispersion cancels said material dispersion of said wedge prism so that said radiation in said second optical beam exits from said dichroic coating having substantially zero chromatic dispersion.

4. An apparatus according to claims 1, 2, or 3, in which said first optical beam comprises radiation in a first frequency range, said second optical beam comprises radiation in a second frequency range, and said dichroic coating is substantially reflective in said first frequency range and substantially transmissive in said second frequency range.

5. An apparatus according to claims 1, 2, or 3, in which said first optical beam is in a first polarization state, said second optical beam has a component in a second polarization state differing from said first polarization state and said dichroic coating is substantially reflective to radiation in said first polarization state and is transmissive to radiation in said second polarization state.

* * * * *